US009475953B2

(12) United States Patent
Wu et al.

(10) Patent No.: US 9,475,953 B2
(45) Date of Patent: Oct. 25, 2016

(54) COATING COMPOSITIONS FOR IMPROVED BLOCK RESISTANCE

(71) Applicant: Arkema Inc., King of Prussia, PA (US)

(72) Inventors: Wenjun Wu, Cary, NC (US); Jeffrey A. Schneider, Holly Springs, NC (US); Albert R. Miner, II, Grayson, GA (US)

(73) Assignee: Arkema Inc., King of Prussia, PA (US)

( * ) Notice: Subject to any disclaimer, the term of this patent is extended or adjusted under 35 U.S.C. 154(b) by 75 days.

(21) Appl. No.: 14/613,521

(22) Filed: Feb. 4, 2015

(65) Prior Publication Data
US 2015/0152280 A1 Jun. 4, 2015

Related U.S. Application Data

(63) Continuation of application No. 13/002,181, filed as application No. PCT/US2009/003868 on Jun. 30, 2009, now Pat. No. 8,980,993.

(60) Provisional application No. 61/134,495, filed on Jul. 10, 2008.

(51) Int. Cl.
C09D 131/04 (2006.01)
C08L 31/04 (2006.01)
C09D 133/06 (2006.01)

(52) U.S. Cl.
CPC ............. *C09D 131/04* (2013.01); *C08L 31/04* (2013.01); *C09D 133/06* (2013.01); *C08L 2201/52* (2013.01); *C08L 2203/16* (2013.01)

(58) Field of Classification Search
CPC ............. C08L 31/04; C08L 2201/52; C08L 2203/16; C09D 131/04; C09D 133/06
USPC ........................................ 524/501; 427/385.5
See application file for complete search history.

(56) References Cited

U.S. PATENT DOCUMENTS

| 5,270,380 A | 12/1993 | Adamson et al. |
| 6,664,327 B2 | 12/2003 | Daisey, Jr. et al. |
| 7,101,921 B2 | 9/2006 | Edwards et al. |
| 2003/0163957 A1* | 9/2003 | Chen ............... B24D 3/285 51/298 |
| 2004/0247783 A1 | 12/2004 | Rosano |

FOREIGN PATENT DOCUMENTS

| BE | 845025 | 2/1977 |
| CA | 1068029 | 2/1977 |
| DE | 25 35 372 A1 | 2/1977 |
| DE | 25 35 373 | 2/1977 |
| EP | 0 795 591 A2 | 9/1997 |
| EP | 1 018 535 A1 | 7/2000 |
| EP | 1 371 685 A2 | 12/2003 |
| EP | 1 833 933 B2 | 11/2013 |
| GB | 1 541 909 | 3/1979 |
| JP | A2004/323735 | 11/2004 |
| WO | WO 2010/005511 A1 | 1/2010 |

OTHER PUBLICATIONS

Glasubergangstemperatur Wikipedia; Jul. 10, 2014.
Extract from Polymer Handbook, 2nd Edition, John Wiley & Sons, 1966.
Notice of Opposition by Celanese Emulsions GmbH against European Patent EP 2 297 258 Mar. 19, 2014.
Wu, Wenjun, et al., "Blending Vinyl Acetate-Ethylene and Acrylic Latexes to Achieve Targeted Performance Properties", The Dow Chemical Company, JCT Coating Tech., May 2008, vol. 5, pp. 44-52.
Wu, Wenjun, et al., ICE 2007, International Coating Expo: Clean-Lean-Green: Innovative Solutions for the Global Coatings Community, Toronto, ON Canada, Oct. 3-5, 2007, 23/1-23/13, Publisher Federation of Societies for Coatings Technology, Blue Bell, PA Coden: 69KFKA, 2007.

* cited by examiner

Primary Examiner — Ling Choi
Assistant Examiner — Chun-Cheng Wang
(74) Attorney, Agent, or Firm — Lynn B. Morreale

(57) ABSTRACT

Embodiments include coating compositions, methods of coating a substrate, and substrates having at least one surface coated according to the methods of the present disclosure. The aqueous, substantially volatile organic compound (VOC)-free coating compositions includes an acrylic latex and a vinyl acetate-ethylene latex including from about 10 to about 90 weight percent of a vinyl acetate-ethylene polymer, based on total weight of acrylic polymer and vinyl acetate-ethylene polymer, having a $T_g$ from about −20 to about 20 degrees Celsius; and from about 10 to about 90 weight percent of an acrylic polymer, based on the total weight of acrylic polymer and vinyl acetate-ethylene polymer, the acrylic polymer comprising, in polymerized form, at least one ethylenically unsaturated (meth)acrylic monomer and from about 0.01 to about 10 weight percent, based on total weight of the acrylic polymer, of an acetoacetate moiety containing monomer, where the acrylic polymer has a $T_g$ of from about −20 to about 20 degrees Celsius.

14 Claims, No Drawings

COATING COMPOSITIONS FOR IMPROVED BLOCK RESISTANCE

CROSS REFERENCE TO RELATED APPLICATIONS

This application is a continuation application of, and claims benefit to U.S. application Ser. No. 13/002,181, filed Feb. 22, 2011, which was a national stage application under 35 US.C. §371 of PCT/US2009/03868, filed Jun. 30, 2009, which claims benefit to U.S. application Ser. No. 61/134,495, filed Jul. 10, 2008.

FIELD OF THE DISCLOSURE

Embodiments of the present disclosure relate to substantially volatile organic compound (VOC)-free coating compositions; more specifically, embodiments relate to substantially VOC-free aqueous coating compositions having increased block resistance.

BACKGROUND

Dried paint often comes into contact with itself, for example, in window and door areas. Depending on the dried paint's hardness, the pressure, the temperature, the humidity, and the duration of time in which the surfaces are in contact, the painted surfaces sometimes stick together. This undesirable sticking together of two painted surfaces when pressed together or placed in contact with each other is referred to as "blocking." Thus, an important characteristic of coatings is the block resistance.

The glass transition temperature ($T_g$) of a polymer is an inherent physical property of the monomer or monomers used to make a polymer included in a coating composition. The $T_g$ of a polymer determines the relative hardness or softness of the polymer. The higher the polymer's $T_g$, the harder the polymer, and the lower the polymer's $T_g$, the softer the polymer. As such, the $T_g$ of a polymer can help to determine the physical characteristics of a film formed from a coating composition containing the polymer. The $T_g$ of the polymer can also help to determine the minimum temperature at which the coating composition containing the polymer can be applied to a substrate to form a film, or the minimum film forming temperature (MFFT). The MFFT is the lowest temperature at which the polymer particles of the coating composition will mutually coalesce and form a continuous film when the water evaporates.

In order to provide a coating with the ability to form a film hard enough to avoid tackiness, blocking, and dirt pickup, polymers with blends of polymers having different $T_g$ values have been used in coating compositions. By increasing the $T_g$ of a polymer useful as a binder in a coating, the hardness of the final coating also increases. This is useful since the hardness of a coating affects other desirable properties of the coating, such as, for example, block resistance. However, increasing the $T_g$ of a polymer can also create a coating with a high MFFT.

Coalescing solvents normally are required in coating compositions since it is desired that the coating composition has the lowest possible MFFT and he highest possible glass transition temperature. Coalescing solvents are organic solvents or plasticizers that effectively lower the MFFT of the polymer to meet the desired low MFFT on application, and then eventually diffuse out of the coating composition and evaporate under normal ambient conditions of temperature, humidity, and atmospheric pressure, leaving a high $T_g$ film.

Although the use of coalescents has proven to be a very useful way to solve the problem of obtaining certain desired film properties with high $T_g$ polymers, which do not readily form films at desired application temperatures, this solution has created another problem. During the drying of a coalescent containing formulation, the organic solvents evaporate and enter into the atmosphere. In addition to the unpleasant odor associated with these organic solvents, there is growing concern about the potentially adverse environmental and health effects of many of these organic solvents.

As such, there is a growing need for polymers for use in coating compositions, which will provide desired hardness properties, adequate film formation at low temperature, and flexibility. In addition, it is also desirable to eliminate volatile coalescents without compromising physical properties such as coating hardness and low MFFT.

SUMMARY

Embodiments o he present disclosure include coating compositions, methods of coating a substrate with the coating compositions of the present disclosure, and substrates having at least one surface coated with a film of the coating compositions of the present disclosure according to the methods of the present disclosure. Embodiments of the present disclosure also include methods of improving the block resistance properties of the film, and the coating composition for forming the film with improved block resistance.

The coating composition of the present disclosure provide an aqueous, substantially volatile organic compound (VOC)-free composition having an acrylic latex and a vinyl acetate-ethylene latex with about 10 to about 90 weight percent of a vinyl acetate-ethylene polymer, based on total weight of acrylic polymer and vinyl acetate-ethylene polymer, having a $T_g$ of from about −20 to about 20 degrees Celsius and from about 10 to about 90 weight percent of an acrylic polymer, based on total weight of acrylic polymer and vinyl acetate-ethylene polymer. For the various embodiments, the acrylic. polymer can include, in polymerized form, at least one ethylenically unsaturated (meth)acrylic monomer and about 0.01 to about 10 weight percent, based on total weight of the acrylic polymer, of an acetoacetate moiety containing monomer, where the acrylic polymer can have a $T_g$ from about −20 to about 20 degrees Celsius.

In addition, methods of the present disclosure include coating a substrate with the aqueous, substantially VOC-free coating composition including an acrylic latex and a vinyl acetate-ethylene latex and converting the aqueous coating composition to a dry coating.

As used herein, a "surfactant" refers to an agent that lowers the surface tension of a liquid and/or lowers the interfacial tension between two liquids.

As used herein, an "emulsion" refers to a stable suspension consisting of an immiscible liquid and/or solid dispersed and held in another liquid with the aid of a surfactant.

As used herein, "emulsion polymerization" refers to a type of radical polymerization that can start with an emulsion incorporating water, monomers, and surfactant.

As used herein, the term "(meth)" indicates that the methyl substituted compound is included in the class of compounds modified by that term. For example, the term (meth)acrylic acid represents acrylic acid and methacrylic acid.

As used herein, "latex" refers to an aqueous dispersion of polymer particles prepared by emulsion polymerization of one or more monomers.

As used herein, the term "substantially volatile organic compound (VOC)-free" refers to the coating composition being substantially free of volatile organic compounds.

As used herein, "self film forming" refers to polymers and/or blends of polymers that can form a film without the aid of coalescing solvents. Although the term refers to the properties of a film on a substrate, the term self film forming equally applies to coatings formed on substrates, according to embodiments of the present disclosure.

As used herein, "minimum film forming temperature" or "MFFT" refers to the west temperature at which the polymer particles of a coating composition will mutually coalesce and form a continuous film when the volatile component (e.g., water) evaporates. Although the MFFT refers to a film on a substrate, the term MFFT equally applies to coatings formed on substrates, according to embodiments of the present disclosure.

As used herein, "volatile coalescent," "coalescent", and "coalescing solvent" refers to those coalescents which diffuse out from the applied film of the coating composition and evaporate under typical ambient conditions. By typical ambient conditions, it is meant those conditions of temperature, humidity, and barometric pressure under which latex paints are typically applied and allowed to dry.

As used herein, a "volatile organic compound" or "VOC" is defined as any volatile compound of carbon, excluding methane, carbon monoxide, carbon dioxide, carbonic acid, metallic carbides or carbonates, ammonium carbonate, and exempt compounds according to the Environmental Protection Agency and under, for example, 40 Code of Federal Regulations §51.100(s).

As used herein, a "zero-volatile organic compound coalescent," or "zero-VOC coalescent," and a "low-VOC coalescent" refers to those coalescents or plasticizers that can improve the film-forming properties of a coating composition that contain substantially no VOCs or a small amount of VOCs.

As used herein, a "zero VOC coating composition" is a coating composition where the total amount of VOCs in the coating composition is less than 50 grams/liter. In addition, as discussed herein, the coating composition can be applied to a substrate and allowed to dry to form a coating. As one skilled in the art will appreciate, the VOC content of a coating can be determined using EPA Reference Method 24.

As used herein, "converting a wet coating on a substrate surface to a dry coating" refers to a process by which the wet coating formed from the coating composition of the present disclosure dries to form the coatings of the present disclosure. Such processes include actively drying the wet coating through the use of heat, drying ovens, and/or fans, or the like, as well as passively allowing the wet coating to dry, i.e., taking no action to dry the wet coating other than merely allowing it to dry.

As used herein, "a," "an," "the," "at least one," and "one or more" are used interchangeably. The terms "comprises" and variations thereof do not have a limiting meaning where these terms appear in the description and claims. Thus, for example, a coating composition including an acrylic latex and a vinyl acetate-ethylene latex that includes "an" acrylic polymer can be interpreted to mean that the acrylic latex and the vinyl acetate-ethylene latex includes "one or more" acrylic polymers.

The term "and/or" means one, more than one or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. in several places throughout the application, guidance is provided through lists of examples, which can be used in various combinations. In each instance, the recited list serves only as a representative group and should not be interpreted as an exclusive list.

DETAILED DESCRIPTION

Embodiments of the present disclosure include coating compositions, methods of coating a substrate with the coating compositions of the present disclosure, and substrates having at least one surface coated with a film of the coating compositions of the present disclosure according to the methods of the present disclosure. Embodiments of the present disclosure also include methods of improving the block resistance properties of the film, and the coating composition for forming the film with improved block resistance.

The coating compositions of the present disclosure provide an aqueous, substantially volatile organic compound (VOC)-free composition, For the various embodiments, the substantially volatile organic compound (VOC)-free coating compositions of the present disclosure can be prepared from a blend of latexes. The compositions can be used to form a coating with improved block resistance. The blend of latexes includes a vinyl acetate-ethylene polymer and an acrylic polymer. The polymers can be prepared using free radical emulsion polymerization techniques, among other techniques, which are known in the art.

Embodiments of the present disclosure include coating compositions and methods of coating using coating compositions that do not necessarily require the presence of coalescing agents and/or plasticizers, thus avoiding the adverse environmental and health effects that are associated with such compounds.

Blends of latexes can be used in coating compositions. To increase the block resistance of a film formed from such blends, at least one of the polymers included in the latex blend can have a high $T_g$ polymer, relative the other polymers used therein, thus forming a film with an increased hardness. However, without the use of coalescing solvents and/or coalescing aids, the amount of high $T_g$ polymer that can be included is limited by the desire to have a low minimum film forming temperature (MFFT) and the desire to prevent forming a film that is brittle or prone to cracking.

Unlike embodiments of the prior art, embodiments of the present disclosure include aqueous, substantially VOC-free coating compositions having an acrylic latex and a vinyl acetate-ethylene (VAF) latex with low $T_g$ value polymers. For the various embodiments, the acrylic latex and the VAE latex of the coating composition include about 10 to about 90 weight percent of a VAE polymer, based on total weight of acrylic polymer and VAE polymer, having a $T_g$ of from about −20 to about 20 degrees Celsius, and about 10 to about 90 weight percent of an acrylic polymer, based on total weight of acrylic polymer and VAE polymer, the acrylic polymer having, in polymerized form, at least one ethylenically unsaturated (meth)acrylic monomer and from about 0.01 to about 10 weight percent, based on total weight of the acrylic polymer, of an acetoacetate moiety containing monomer, where the acrylic polymer has a $T_g$ from about −20 to about 20 degrees Celsius.

Although the VAE polymer and the acrylic polymer are low $T_g$ polymers, the coating composition, as described herein, can surprisingly form a coating with improved block resistance while not requiring the use of coalescents effectively lower the $T_g$ of the polymers. The low $T_g$ values of the VAE polymer and the acrylic polymer cause the polymers to be self film forming and to have a minimum film forming temperature (MFFT) below about 15 degrees Celsius. In some embodiments, the VAE polymer and the acrylic polymer can have a MFFT below about 5 degrees Celsius. By having a low MFFT, the coating composition can be applied over a long seasonal range.

In some embodiments, the amount of ethylene monomer used to prepare the VAE polymer is from about 5 to about 30 weight percent, preferably from about 10 to about 20 weight percent, and most preferably from about 10 to about 15 weight percent, based on the total weight of monomers used to prepare the VAE polymer. In some embodiments, the amount of vinyl acetate monomer used to prepare the VAE polymer can be from about 70 to about 95 weight percent, from about 80 to about 90 weight percent, or from about 85 to about 90 weight percent, based on the total weight of monomers used to prepare the VAE polymer.

In addition, up to about 20 weight percent, preferably less than 10 weight percent, of the vinyl acetate monomer used in forming the VAE polymer may be substituted with one or more ethylenically unsaturated comonomers. Exemplary ethylenically unsaturated comonomers include acrylate monomers and ethylenically unsaturated monomers that contain at least one carboxyl group attached directly to an olefinic carbon.

Examples of acrylate monomers are esters of monocarboxylic acids and di-esters of dicarboxylic acids. In some embodiments, the acrylate monomers can be selected from $C_1$-$C_{10}$ alkyl esters of α-β-ethylenically unsaturated $C_2$-$C_6$ monocarboxylic acids; hydroxy $C_1$-$C_4$ alkyl esters of α-β-ethylenically unsaturated $C_2$-$C_6$ monocarboxylic acids; and $C_4$-$C_8$ alkyl diesters of α-β-ethylenically unsaturated $C_4$-$C_8$ dicarboxylic acids. Specific examples of acrylate monomers include methyl acrylate, ethyl acrylate, butyl acrylate, 2-ethylhexyl acrylate, decyl acrylate, methyl methacrylate, butyl methacrylate, isobutyl methacrylate, isobornyl methacrylate hydroxyethyl acrylate, and hydroxyethyl methacrylate.

Examples of monomers which contain at least one carboxyl group attached directly to the olefinic carbon include α-β-ethylenically unsaturated $C_3$-$C_8$ monocarboxylic acids, α-β-ethylenically unsaturated $C_4$-$C_8$ dicarboxylic acids and the anhydrides thereof, and the $C_4$-$C_8$ alkyl half-esters of the α-β-ethylenically unsaturated $C_4$-$C_8$ dicarboxylic acids. Such monomers can be selected from acrylic acid and methacrylic acid, and the $C_4$-$C_4$ alkyl half esters of maleic acid, maleic anhydride, fumaric acid, and itaconic acid.

In some embodiments, the acrylic polymer can be an aqueous emulsion polymerization product of an ethylenically unsaturated (meth)acrylic monomer. For example, the ethylenically unsaturated (meth)acrylic monomer can be selected from the group consisting of acrylic and methacrylic acids; alkyl acrylates and methacrylates, and hydroxyl-substituted derivatives; acrylonitrile; glycidyl acrylates and methacrylates, and combinations thereof.

In addition, up to about 10 weight percent, preferably less than 5 weight percent of the (meth)acrylic monomer in the acrylic polymer may be substituted with one or more ethylenically unsaturated comonomers. Exemplary ethylenically unsaturated comonomers can include, among others, styrene and its derivatives, vinyl esters including vinyl acetate, vinyl isopropyl acetate, vinyl propionate, vinyl butyrate, vinyl pivalate, vinyl neo-nonanoate, 2-ethyl hexanoate, vinyl neo-decanoate, vinyl neoendecanoate, vinyl neo-dodecanoate, and mixtures thereof.

In addition, as discussed herein, the acrylic polymer can comprise, in polymerized form, at least one ethylenically unsaturated (meth)acrylic monomer and about 0.01 to about 10 weight percent, based on total weight of the acrylic polymer, of an acetoacetate moiety containing monomer. in some embodiments, the acetoacetate moiety is present in an amount from about 1 to about 10 weight percent, preferably from about 1 to about 5 weight percent, based on total weight of the acrylic polymer.

For the various embodiments, the acetoacetate moiety containing monomer can be selected from the group consisting of 2-acetoacetoxyethyl (meth)acrylate, 3-acetoacetoxypropyl (meth)acrylate, 4-acetoacetoxybutyl (meth)acrylate, 2-cyanoacetoxypropyl (meth)acrylate, 4-cyanoacetoxybutyl (meth)acrylate, N-(2-acetoacetoxyethyl) (meth)acrylamide, acetoacetate, 2,3-di(acetoacetoxyl) propyl (meth)acrylate, vinyl acetoacetate, and combinations thereof.

In some embodiments, the acrylic polymer may also include, in polymerized form, at least one wet adhesion monomer. The wet adhesion monomer can be present in an amount of from about 0.01 to about 10 weight percent, preferably about 0.05 to about 2 weight percent, based on the total weight of the acrylic polymer. in order to optimize the wet adhesion of the coating composition, the acrylic polymer may comprise about 0.05 to about 2 weight percent, based on the total weight of the acrylic polymer, of a wet adhesion monomer, or a combination of wet adhesion monomers.

Wet adhesion monomers can include, but are not limited to, aminoethyl acrylate and methacrylate, dimethylaminopropyl acrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N(3-dimethlamino-2,2-dimethylpropyl) acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacrloyloxyethyl) ethylene urea, N-(2-methacryloxyacetamidoethyl)-N, N'-ethyleneurea, ethylene urea, N-methacrylamidomethyl urea, N-methacryoyl urea, N-[3-(1,3-diazacryclohexan)-2-on-propy]methacrylamide, 2-(1-imidazolyl)ethyl methacrylate, 2-(1-imidazolidin-2-on)ethylmethacrylate, N-(methacrylamido)ethyl urea (SIPOMER WAM II, Rhone-Poulenc), and allyl ureido wet adhesion monomer (SIPOMER WAM, Rhone-Poulenc), among others.

The acrylic polymer can be present in the coating composition including acrylic latex and the VAE latex in an amount of from about 10 to about 90 weight percent, preferably from about 10 to about 50 weight percent, based on the total weight of the acrylic polymer and the VAE polymer. The VAE polymer is present in an amount of from about 10 to about 90 weight percent, preferably from about 50 to about 90 weight percent, based on the total weight of the acrylic polymer and the VAE polymer.

As one skilled in the art will appreciate, in some prior art coating compositions, a blend of large particle size polymers and small particle size polymers having a high $T_g$ have been used to create a coating with an improved block resistance. In such prior art coatings, when the coating forms, the small particle sized polymers tend to accumulate on the surface.

Since the small particle size polymers have a high $T_g$, the small particle sized polymers can give the coatings a surface hardness responsible for the improved block resistance, However, the use of small particles also has drawbacks. For example, the process of forming the small particles can include the use of water soluble ingredients. Such use of water soluble ingredients can have a detrimental impact on other properties of the coating, including water resistance and wet adhesion.

In embodiments of the present disclosure, however, the VAE polymer and the acrylic polymer can have approximately equal relative particle sizes, or in the ranges listed herein, while still creating a coating from the coating composition that has improved block resistance.

In some embodiments, the relative particle size ratio of the VAE polymer to the acrylic polymer is from about 5:1 to about 1:1, preferably about 4.5:1 to about 1.5:1. In some embodiments, the acrylic polymer can contain particles with a volume averaged diameter from about 0.05 to about 0.30 microns, preferably about 0.07 to about 0.20 microns. The volume averaged particle diameter is determined by a laser light scattering technique.

In sonic embodiments, the acrylic polymer can be prepared by emulsion polymerization. The emulsion polymerization of the acrylic polymer as well as the VAE polymer can be accomplished by known procedures for polymerization in aqueous emulsion. Optionally, conventional seeding procedures can be employed to aid in controlling polymerization to achieve the desired average particle size and particle size distribution. The seed latex can constitute a previously prepared latex or polymer powder, or it can be prepared in situ. While the monomeric composition of the seed latex can vary, it is preferable that it be substantially the same as that of the polymer.

The monomer or comonomers and, optionally, the seed to be employed in the preparation of the polymer, can be dispersed into water with agitation sufficient to emulsify the mixture. The aqueous medium may also contain a free radical polymerization initiator, a surfactant, or other ingredients that are known and employed in the art as emulsion polymerization aids.

Suitable free radical polymerization initiators are the initiators known to promote emulsion polymerization and can include water-soluble oxidizing agents, such as organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.), redox pairs, and those initiators that are activated in the water phase by a water-soluble reducing agent. Such initiators are employed in an amount sufficient to initiate polymerization.

Suitable surfactants can include anionic, cationic, and nonionic surfactants customarily used in emulsion polymerization, as well as reactive surfactants. Usually, at least one anionic surfactant can be utilized and one or more nonionic surfactants may also be utilized. Representative anionic surfactants are the alkyl aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl disodium sulfosuccinate, and dioctyl sodium sulfosuccinate. Representative reactive surfactants are the oleic acid derivatives. The surfactants can be employed in amounts to achieve adequate emulsification and to provide desired particle size and particle size distribution.

Other ingredients known in the art to be useful for various specific purposes in emulsion polymerization, such as, acids, salts, chain transfer agents, buffers, and chelating agents, can also be employed in the preparation of the polymers of the present disclosure. Water-soluble or water-dispersible polymerizable surfactants may also be used alone or in combination with nonpolymerizable surfactant(s) to prepare the polymers of the present disclosure.

The manner of combining the polymerization ingredients can be by various known monomer feed methods, such as, continuous monomer addition, incremental monomer addition, or addition in a single charge of the entire amount of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Polymerization can be initiated by heating the emulsified mixture with continued agitation to a temperature usually between about 50 to 100 degrees Celsius. Polymerization can be continued by maintaining the emulsified mixture at the selected temperature until conversion of the monomer or monomers to polymer has been reached.

Following polymerization, the solids content of the resulting aqueous heterogeneous polymer latex can be adjusted to the level desired by the addition of water or by the removal of water, for example, by distillation. Generally, the desired level of polymeric solids content is from about 20 to about 60 percent by weight on a total weight basis.

In some embodiments, the aqueous, substantially VOC-free coating composition can be used in a method of coating a substrate. Such embodiments include coating a substrate surface with the aqueous, substantially VOC-free coating composition including the latex blend, as discussed herein, to form a wet coating on the substrate surface. The method further includes converting the wet coating on the substrate surface to a dry coating. I some embodiments, converting the wet coating on the substrate surface to the dry coating can include actively drying the wet coating through the use of heat, drying ovens, and/or fans, or the like. In various embodiments, the wet coating on the substrate surface can be converted to the dry coating by passively allowing the wet coating to dry, i.e., taking no action to dry the wet coating other than merely allowing the wet coating to dry.

As discussed herein, embodiments of the present disclosure can be used to produce a coating with improved block resistance. For example, the dry coating formed from the coating composition can have a block resistance of at least 4 evaluated according to ASTM D4946.

Similarly, embodiments of the present disclosure include a substrate having at least one surface coated according to the methods discussed herein. The substrate can be coated with the coating composition, where the coating composition dries to create a coating on the substrate. The coating can have a block resistance of at least 4 evaluated according to ASTM D4946, In some embodiments, the coating composition containing the latex blend can be used either neat or with additives so as to provide a paint, an. architectural coating, an industrial coating, an automotive coating, and a paper coating. In addition, as one skilled in the art will appreciate, the coating composition can also be used either neat or with additives so as to provide a sealant, an adhesive, an elastomer, an ink, and/or a varnish, among others.

The aqueous, substantially VOC-free coating compositions of the present disclosure may additionally contain other additives which include pigments such as titanium oxide, dispersing agents, defoaming agents, anti-freezing agents, humectants, thickeners, defoamers, colorants, waxes, bactericides, fungicides, and fillers such as cellulose or glass fibers, clay, kaolin, talc., calcium carbonate, and wood meal, and/or odor-modifying agents.

in addition, the aqueous, substantially VOC-free coating compositions of the present disclosure may optionally include zero and/or low-VOC coalescents to improve the film-forming properties of the coating compositions of the present disclosure. When the zero and/or low-VOC coalescents are included in the coating composition, the total amount of VOCs in the coating composition can be less than about 50 grams/liter.

Such zero and/or low VOC coalescents can be selected from the group including, but not limited to, ARCHER RC (Archer Daniels Midland Co.), VELATE 368 (Velsicol Chemical Corp.), SER-AD FX-511 (Condea Servo L.L.C), EDENOL EFC-100 (Cognis Corp.), OPTIFILM ENHANCER 400 (Eastman Chemical Co.), PLUROCOAT CA110 (BASF-The Chemical Co.), and SOLUSOLV 2075 (Solutia Inc.).

In preparing the aqueous, substantially VOC-free coating compositions, the acrylic latex and the VAE latex can be mixed with the additive(s). The additive(s) may be added during the polymerization and/or after the polymerization of the acrylic latex and/or the VAE latex.

As discussed herein, the coating compositions may be applied to a substrate. The substrate can be formed of a wide variety of materials including, hut not limited to, wood, cement, concrete, nonwoven or woven fabrics, aluminum or other metals, glass, ceramics (glazed or unglazed), tiles, polyvinyl chloride and polyethylene terephthalate and other plastics, plaster, stucco, roofing substrates such as asphaltic coatings, roofing felts, synthetic. polymer membranes, and foamed polyurethane insulation. In addition, the coating compositions may be applied to previously painted, primed, undercoated, worn, or weathered substrates.

The following nonlimiting examples illustrate further aspects of the invention. Embodiments of the present disclosure are illustrated by the following examples. It is to he understood that the particular examples, materials, amounts, and procedures are to be interpreted broadly in accordance with the scope and spirit of the invention as set forth herein.

EXAMPLES

The following examples are given to illustrate, but not limit, the scope of this disclosure. Unless otherwise indicated, all parts and percentages are by weight. Unless otherwise specified, all instruments and chemicals used are commercially available.

Materials

Cellosize™ ER-4400 Hydroxyethyl Cellulose ("ER4400") available from The Dow Chemical Company, Midland, Mich.

Propylene Glycol available from The Dow Chemical Company, Midland, Mich.

KATHON™ LX, 1.5% available from Rohm and Haas Co., Philadelphia, Pa.

RHODOLINE® (Colloid) 226-35 available from Rbodia-Novecare, Cranbury, N.J.

Potassium tetra pyro phosphate ("KTPP") available from Parcbem Trading Ltd., White Plains, N.Y.

RHODOLINE® (Colloid) 643 available from Rhodia-Novecare, Cranbury, N.J.

Ammonium Hydroxide available from Fisher Scientific, Inc., Pittsburgh, Pa.

TI-PURE® R-706 available from Dupont Co., Wilmington, Del.

POLYGLOSS® 90 available from Huber Engineered Materials, Macon, Ga.

ACRYSOL™ RM 2020 available from Rohm and Haas Co., Philadelphia, Pa.

RHOPLEX™ SG-30 available from Rohm and Haas Co., Philadelphia, Pa.

UCAR™ Latex 6030 available from The Dow Chemical Company, Midland, Mich.

EVOCAR DA™ 281 brand vinyl acetate/ethylene latex having a volume average diameter of 0.40 micron, available from The Dow Chemical Company, Midland Mich.

Acrylic Latex 1 is an acrylic latex having a $T_g$ of 0 degrees Celsius (° C.) prepared from the following monomers: butyl acrylate, methyl methacrylate, methacrylic acid, a wet adhesion monomer (ROHAMERE 6852 available from Evonik Industries AG, Essen, Germany), and 2 percent, based on total monomer weight, of acetoacetoxyethyl methacrylate (AAEM) (available from Eastman Chemical Co., Kingsport, Tenn.).

Test Procedures

The following test procedures are conducted on test paints, as are discussed herein.

Room Temperature (RT) Block Resistance: The test paints are drawndown on a Leneta 3B Opacity chart (available from The Leneta Co., Mahwah, N.J.) using a 3 mil bird drawdown bar. As used herein, a "mil" refers to one thousandth of an inch. The films for room temperature (RT) block resistance are dried in a constant temperature, constant humidity (CT/CH) (22 degrees Celsius and 40 to 60 percent relative humidity) lab for 1 and 3 days. Two square paint strips of about 1 inch are placed together with paint film against paint film under 1 pound of weight in the CT/CH lab. After 24 hours, the strips are separated and evaluated according to the ASTM D-4946 ratings. The test is repeated three times and the average value is reported.

Elevated Temperature (ET) Block Resistance: The paint strips are dried in CT/CH Lab for 1 day. The paint strips (film against film) are then placed into a 120 degree Fahrenheit (°F.) (49° C.) oven under 1,000 grams (g) of weight for 30 minutes for an elevated temperature (ET) block test, The films are allowed to cool at room temperature for 30 minutes before the ratings of film separation are given.

$T_g$: The glass transition temperature ($T_g$) of the polymers are determined by differential scanning calorimetry (DSC).

Table 1 provides the formulation of a test paint referred to hereinafter as Paint 1. Paint 1 employs an 80/20 (wt. %/wt. %) blend of a VAE latex and an acrylic latex. As used herein, the "grind" is that portion of the paint formulation which includes the pigments, fillers and the like. The pigments and fillers are "ground" using conventional mixing techniques, to a particular Hegman dispersion value. The grind is then "let down", that is, the balance of the paint composition, including a latex binder and any balance of water, are added to the grind and mixed.

TABLE 1

| Ingredient | Pounds | Gallons |
| --- | --- | --- |
| Grind | | |
| Water | 231.1 | 27.70 |
| Cellosize ™ ER4400 | 5.0 | 0.40 |

TABLE 1-continued

| Ingredient | Pounds | Gallons |
| --- | --- | --- |
| Propylene Glycol | 10.0 | 1.20 |
| KATHON ™ LX, 1.5% | 1.8 | 0.20 |
| RHODOLINE ® 226-35 | 7.0 | 0.70 |
| KTPP | 1.5 | 0.10 |
| TRITON ™ CF-10 | 2.5 | 0.30 |
| RHODOLINE ® 643 | 1.0 | 0.10 |
| Ammonium Hydroxide, 28% | 1.0 | 0.10 |
| TI-PURE ® R-706 | 225.0 | 6.80 |
| POLYGLOSS ® 90 | 25.0 | 1.20 |
| Letdown | | |
| EVOCAR DA ™ 281, 55% solids | 335.0 | 37.50 |
| Acrylic Latex 1, 50% solids | 90.0 | 10.10 |
| Water | 97.0 | 11.60 |
| ACRYSOL ™ RM 2020 | 10.0 | 1.10 |
| RHODOLINE ® 643 | 1.5 | 0.20 |
| Ammonium Hydroxide, 28% | 2.0 | 0.30 |
| Totals | 1046.40 | 99.70 |
| Weight Solids (%) | 45.80 | |
| Volume Solids (%) | 30.30 | |
| PVC (%) | 26.20 | |

Example 1

In this Example, the block resistance of Paint 1 is compared to that of two additional test paints prepared according to the formulation of Table 1, except that the comparative paints replace the Acrylic Latex 1 with commercially available acrylic latexes. Table 2 provides the block resistance as well as the relative particle sizes and $T_g$ values of each sample.

TABLE 2

| Acrylic Latex used in Test Paint | $T_g$ (° C.) | Volume Averaged Particle Diameter (micron) | RT Block Rating | ET Block Rating |
| --- | --- | --- | --- | --- |
| RHOPLEX ™ SG-30* | 20 | 0.15 | 7 | 3 |
| UCAR ™ Latex U6030* | 39 | 0.075 | 6 | 2 |
| Acrylic Latex 1 | 0 | 0.14 | 8 | 4 |

*Comparative sample, not an example of embodiments of the present disclosure.

As can be seen from Table 2, RHOPLEX™ SG-30 is a high $T_g$ acrylic latex, while UCAR™ 6030 is a small particle size, high $T_g$ acrylic latex. RHOPLEX™ SG-30 is known for its outstanding block resistance, and UCAR™ 6030 is known to boost block resistance and wet adhesion. However, Table 2 shows that Paint 1, prepared with Acrylic Latex 1, provides better block resistance than test paints prepared with conventional high $T_g$ acrylic latexes when included in the 80 VAE/20 Acrylic blend composition of Table 1.

Example 2

In this Example, the block resistance of test paints prepared according to the formulation of Table 1 from blends of VAE/acrylic latexes is measured using the Room Temperature Block Resistance test as well as the Elevated Temperature Block Resistance test, as described above. The test paints are prepared using the formulation of Table 1, except that the ratio of the latexes is varied while the total amount of latex does not change. The results are provided in Table 3.

TABLE 3

| Acrylic Latex (weight %) used in Test Paint | RT Block Rating | ET Block Rating |
| --- | --- | --- |
| 0 | 4 | 0 |
| 20 | 8 | 4 |
| 50 | 8 | 6 |
| 75 | 8 | 6 |
| 100 | 8 | 6 |

As can be seen from Table 3, the test paint prepared from only the VAE latex is deficient in block resistance, especially at elevated temperature. When the acrylic latex is included in the test paint, the antiblock property of the resulting film is substantially improved.

Example 3

In this Example, the block resistance is measured for test paints prepared using the formulation of Table 1, except that the comparative test paint is prepared by replacing Acrylic Latex 1 with a comparative acrylic latex that has essentially the same monomer composition as Acrylic Latex 1, but for the AAEM included in Acrylic Latex 1. The comparative acrylic latex had the same butyl acrylate/methyl methacrylate monomer ratio as the Acrylic Latex 1, but the wet adhesion monomer (ROHAMERE 6852) was increased from 0.75 wt. % to 2 wt. % based on total monomer. The net result was no change in polymer Tg (0° C.) and equal wet adhesion performance, The results are provided in Table 4.

TABLE 4

| Acrylic Latex used in Test Paint | RT Block Rating | ET Block Rating |
| --- | --- | --- |
| Comparative Acrylic | 3 | 0 |
| Acrylic Latex 1 | 8 | 4 |

As can be seem from Table 4, the acrylic latex containing 2 weight percent AAEM produces block resistance at room temperature and elevated temperature at least 4 units higher than the comparative acrylic latex containing no AAEM.

While the embodiments of the present disclosure have been described with particular reference to certain embodiments thereof, it will be understood that changes and modifications may be made by those of ordinary skill within the scope and spirit of the following claims.

What is claimed:

1. An aqueous, substantially volatile organic compound (VOC)-free coating composition having the total amount of VOCs in the coating composition of less than 50 grams/liter, comprising:
    (a) an acrylic latex and a vinyl acetate-ethylene latex, including:
        from about 10 to about 90 weight percent of a vinyl acetate-ethylene polymer, based on total weight of acrylic polymer and vinyl acetate-ethylene polymer, having a $T_g$ from about −20 to about 20 degrees Celsius; and
        from about 10 to about 90 weight percent of an acrylic polymer, based on the total weight of acrylic polymer and vinyl acetate-ethylene polymer, the acrylic polymer including, in polymerized form, at least one ethylenically unsaturated (meth)acrylic monomer, and in polymerized form at least one wet adhesion monomer, and (b) optionally at least one moiety selected from the group consisting of plasticizers and coalescing aids, where the acrylic polymer has a $T_g$ of from about −20 to about 20 degrees Celsius.

2. The coating composition of claim 1, where the vinyl acetate-ethylene polymer and the acrylic polymer have a minimum film forming temperature below about 15 degrees Celsius.

3. The coating composition of claim 1, where the ethylenically unsaturated (meth)acrylic monomer is selected from the group consisting of acrylic and methacrylic acids; alkyl acrylates, methacrylates, and hydroxyl-substituted derivatives; acrylonitrile; glycidyl acrylates and methacrylates, and combinations thereof.

4. The coating composition of claim 1, where the relative particle size ratio of the vinyl acetate-ethylene polymer to the acrylic polymer is from about 5:1 to about 1:1.

5. The coating composition of claim 1, where the acrylic polymer contains particles with a volume averaged diameter from about 0.05 to about 0.30 microns.

6. The coating composition of claim 1, where a dry film formed from the coating composition has a block resistance of at least 4 evaluated according to ASTM D4946.

7. A method, comprising:
coating a substrate surface with an aqueous, substantially VOC-free coating composition, said coating composition having a total amount of VOCs of less than 50 grams/liter and comprising an acrylic latex and a vinyl acetate-ethylene latex to form a wet coating on the substrate surface, where the acrylic latex and the vinyl acetate-ethylene latex includes:
from about 10 to about 90 weight percent of a vinyl acetate-ethylene polymer, based on total weight of acrylic polymer and vinyl acetate-ethylene polymer, having a $T_g$ from about −20 to about 20 degrees Celsius;
from about 10 to about 90 weight percent of an acrylic polymer, based on the total weight of acrylic polymer and vinyl acetate-ethylene polymer, the acrylic polymer including, in polymerized form, at least one ethylenically unsaturated (meth)acrylic monomer, and in polymerized form at least one wet adhesion monomer,
and optionally at least one moiety selected from the group consisting of plasticizers and coalescing aids, where the acrylic polymer has a $T_g$ of from about −20 to about 20 degrees Celsius; and converting the wet coating on the substrate surface to a dry coating.

8. A substrate having. at least one surface coated according to the method of claim 7, where the dry coating has a block resistance of at least 4 evaluated according to ASTM D4946.

9. The coating composition of claim 1 where the vinyl acetate-ethylene polymer and the acrylic polymer have a minimum film forming temperature below about 5 degrees Celsius.

10. The coating composition of claim 1 where the acrylic polymer includes wet adhesion monomer in an amount of from about 0.01 to about 10 weight percent, based on the total weight of the acrylic polymer.

11. The coating composition of claim 1, where the acrylic polymer contains particles with a volume averaged diameter from about 0.07 to about 0.20 microns.

12. The coating composition of claim 1, where the coalescing aid is a low-VOC coalescent.

13. The coating composition of claim 1, where the coalescing aid is selected from the group consisting of ARCHER RC, VELATE 368, SER-AD FX-511, EDENOL EEC-100, OPTIFILM ENHANCER 400, PLUROCOAT CA110 and SOLUSOLV 2075.

14. The coating composition of claim 1, where the relative particle size ratio of the vinyl acetate-ethylene polymer to the acrylic polymer is from about 4.5:1 to about 1.5:1.

* * * * *